United States Patent [19]  [11] 4,218,609
Chin  [45] Aug. 19, 1980

[54] EDUCATIONAL MECHANICAL CALCULATOR

[76] Inventor: Yi Chin, 23356 Batey Ave., Harbor City, Calif. 90710

[21] Appl. No.: 901,704

[22] Filed: May 1, 1978

[51] Int. Cl.² ............................................. G06C 27/00
[52] U.S. Cl. ...................................... 235/76; 235/109; 235/136; 235/139 R; 35/31 R
[58] Field of Search ............... 235/76, 74, 109, 139 R, 235/136; 35/30, 32, 31 R, 31 A, 31 C

[56] References Cited

U.S. PATENT DOCUMENTS

| 858,974 | 7/1907 | Glasner et al. | 235/74 |
| 1,508,762 | 9/1924 | Bacon | 235/136 |
| 2,533,443 | 12/1950 | Farbman | 235/74 |
| 2,693,911 | 11/1954 | Brown | 235/74 |
| 2,797,047 | 6/1957 | Lehre | 235/74 |
| 3,065,909 | 11/1962 | Herr | 235/139 R |
| 3,193,293 | 7/1965 | Schaper | 35/13 |
| 3,212,200 | 10/1965 | Lundberg | 35/30 |
| 3,302,876 | 2/1967 | Fox | 235/139 R |
| 3,328,954 | 7/1967 | Miller | 235/109 |
| 3,436,013 | 4/1969 | Campbell | 235/74 |
| 3,696,995 | 10/1972 | Kosner | 235/139 R |
| 3,706,875 | 12/1972 | Kosner | 235/74 |
| 3,788,541 | 1/1974 | Garner | 235/76 |

Primary Examiner—L. T. Hix
Assistant Examiner—Benjamin R. Fuller

[57] ABSTRACT

A mechanical calculator employs a register consisting of gears. Each register gear has two sets of teeth. One set has teeth all around the circumference of the wheel while the other set consists of a single carry-over tooth. The register gears are spaced widely enough apart that they do not engage one another. An intermittent carry-over motion is transmitted from one register gear to an adjacent register gear by a selectively insertable and removable carry-over gear, which is mechanically unconnected to the remainder of the calculator. The operations of multiplication and division are enabled by a set of individually selectively insertable and removable multiplying gears. The number of teeth on these gears, and their diameters, are integral multiples of those on the register gears. The multiplying gears are mechanically unconnected to the remainder of the calculator.

5 Claims, 6 Drawing Figures

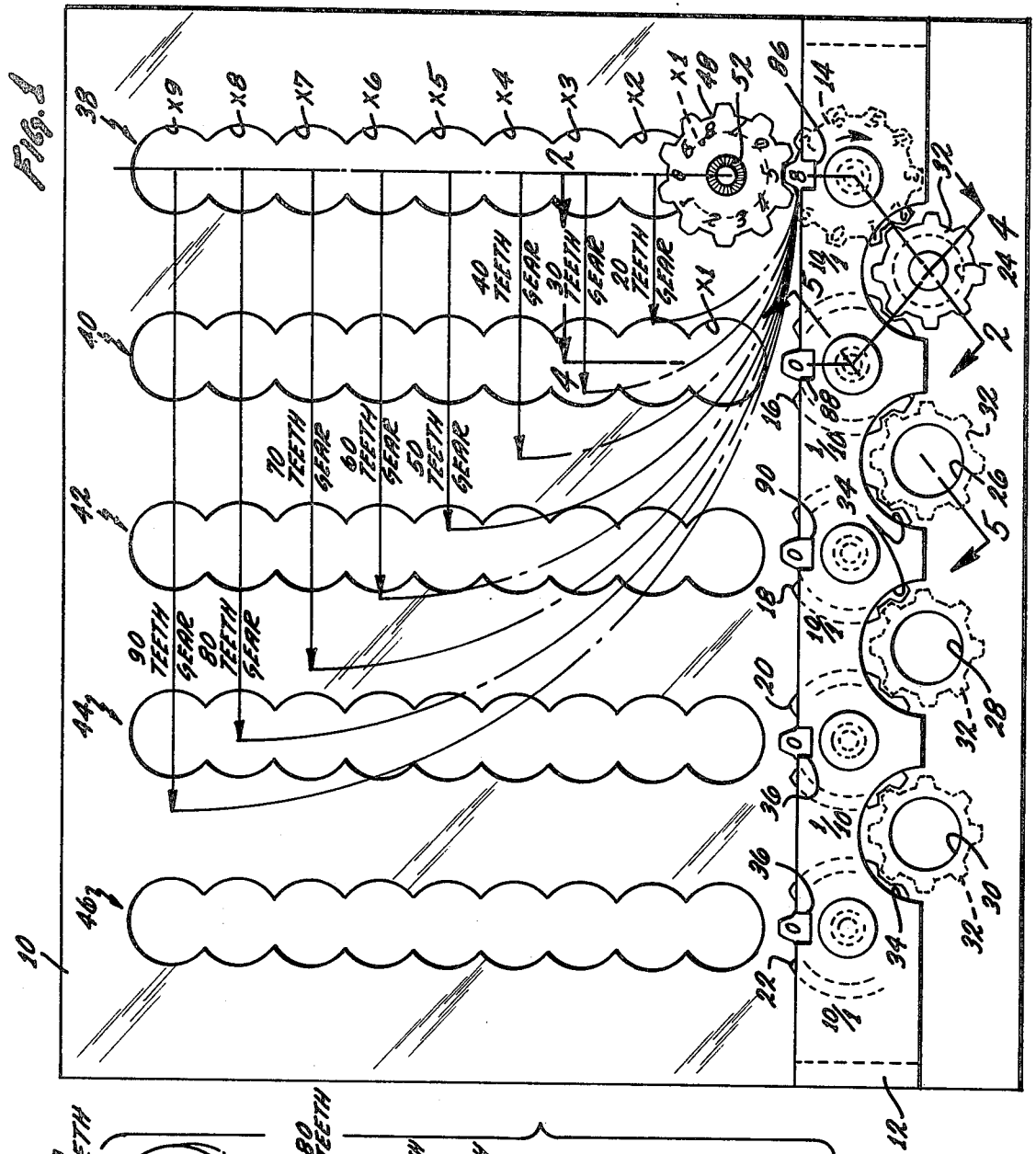
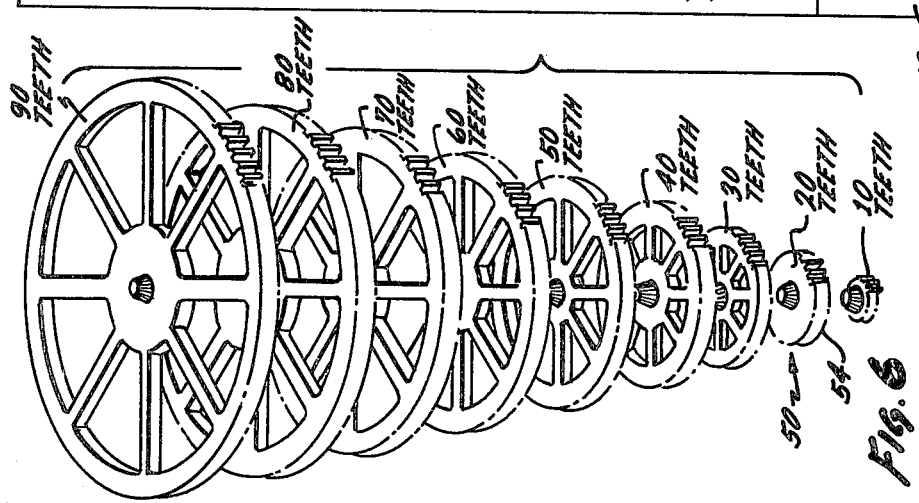
Fig. 1
Fig. 5

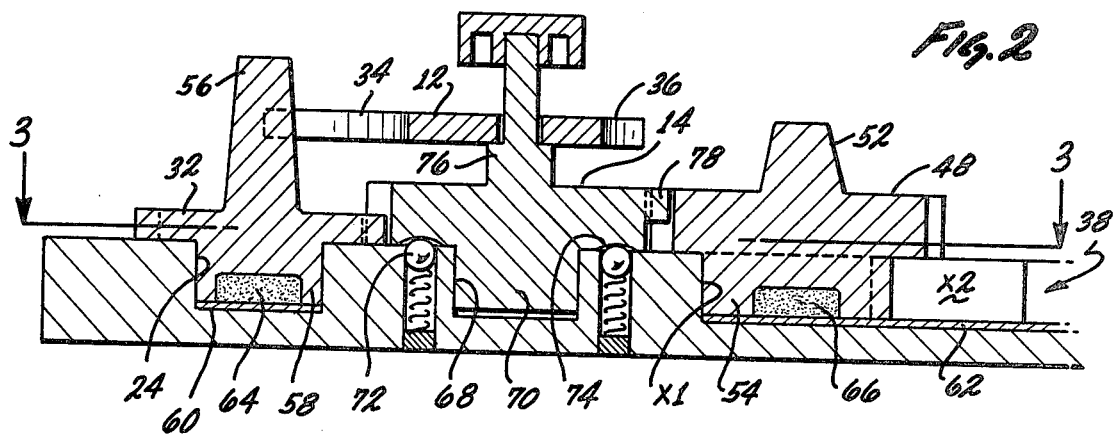
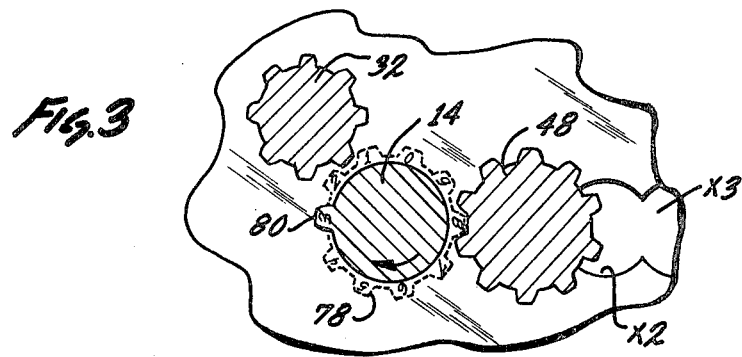
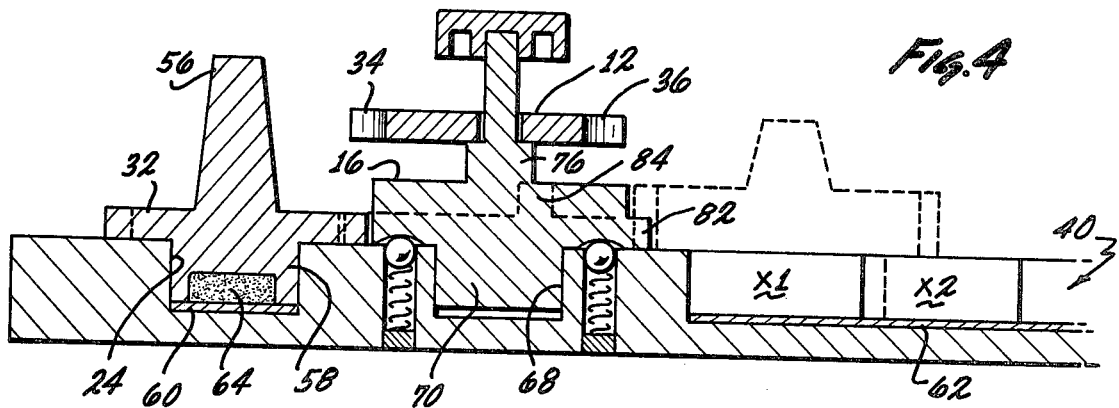
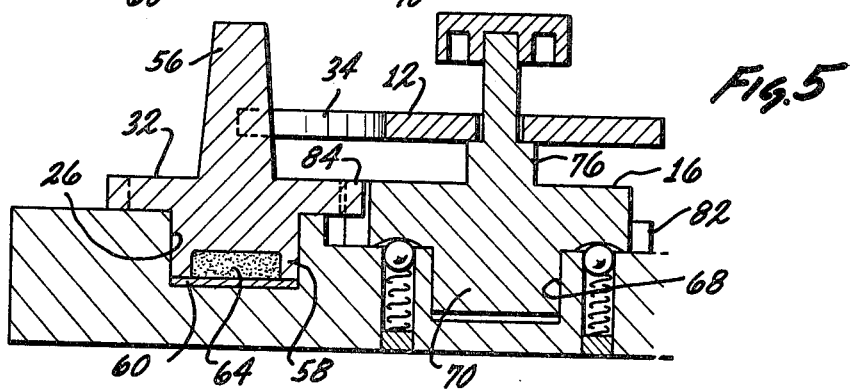

EDUCATIONAL MECHANICAL CALCULATOR

BACKGROUND OF THE INVENTION

1. Field of the Invention

The present invention is in the field of educational devices or toys and more specifically related to a manually-operated mechanical calculator for teaching the basic principles of arithmetic.

2. The Prior Art

The use of geared wheels to indicate the successive digits in a register is known at least from July 2, 1907 when U.S. Pat. No. 858,974 was issued to Glasner et al. Improvements to the basic device were presented by Fardman in U.S. Pat. No. 2,533,443 issued Dec. 12, 1950. Further variations on the basic wheeled calculator are disclosed in U.S. Pat. No. 2,797,047 issued June 25, 1957 to Lehre; in U.S. Pat. No. 3,696,995 issued Oct. 10, 1972 to Kasner; and in U.S. Pat. No. 3,706,875 issued Dec. 19, 1972, also to Kasner. The devices disclosed in the above-mentioned patents perform addition and subtraction, but include no special provision for the operations of multiplication and division. Further, none of the above patents employs removable gear wheels.

In U.S. Pat. No. 2,693,911 issued Nov. 9, 1954 to Brown, there is disclosed a manually-operated mechanical calculator having detachable registers which are used to store the results obtained in successive calculations. It will be seen that the Brown calculator is considerably different in structure and operation from the calculator of the present invention as described below.

In U.S. Pat. No. 3,436,013, issued Apr. 1, 1969 to Campbell, there is disclosed a mechanism for converting numbers from one base or modulus to another. The modulus to be used is chosen by selection of gear B, and by inserting the selected gear into the device. As described, the device is capable of performing simple addition and subtraction, but has no special provision for performing multiplication or division. The insertable gear B is not used for multiplying or dividing, but instead is used for determining the base of the number system. The mechanism disclosed by Campbell does not include provision for operating with multi-digit numbers.

In U.S. Pat. No. 3,212,200 issued Oct. 19, 1965 to Lundberg, there is disclosed an educational device in which gears of various sizes may be inserted in various arrangements. Because the device lacks a display for inputs or outputs, it might be regarded as being an analog computer rather than a digital computer. In any case, the device has no provision for carry-over and does not appear to be capable of performing the same type of arithmetic operations as the present invention.

As will be seen below, the present invention has a different structure and operates in a different manner from the calculators disclosed in the above-mentioned patents.

SUMMARY OF THE INVENTION

The present invention encourages visualization and understanding of the basic arithmetical operations of addition, subtraction, multiplication and division. Alternative embodiments employing number systems of moduli other than ten, drive home the idea that the basic operations are independent of the base chosen to express the numbers.

The present invention is in the form of a desktop calculator, and it can be used to introduce the student to concepts encountered in the field of digital computers, such as digits, registers, carry-over, microinstructions, memory, etc.

The calculator of the present invention is safe and reliable to use and requires no electricity for its operation. It is entirely mechanical and is operated manually. Unlike certain desk calculators, the present invention has no complex assembly of keys and letters; the only moving parts are gears. The invention includes a number of removable gears which are selectively inserted into the device, turned, and then removed from the device at various stages of each calculation, to teach the operations of addition, subtraction, multiplication and division.

The device includes a base in which a number of gears are mounted to form a register. In a preferred embodiment, the gears are retained in the base by magnets. The base includes a first set of sockets into which removable gears can be inserted to provide for carry-over from one digit of the register to the next.

Associated with each digit of the register is a linear series of sockets in the base. These sockets receive the gears of various diameters which are selective inserted to perform steps in executing the basis arithmetic operations.

Thus, the educational calculator of the present invention stimulates interest in basic arithmetic by appealing to the student's mechanical intuition and by providing physical activity as the arithmetic operations are executed. The novel features which are believed to be characteristic of the invention, both as to organization and method of operation, together with further advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a top view of a preferred embodiment of the educational mechanical calculator of the present invention;

FIG. 2 is a side cross-sectional view along the line 2—2 of FIG. 1;

FIG. 3 is a top cross-sectional view along the line 3—3 of FIG. 2;

FIG. 4 is a side cross-sectional view along the line 4—4 of FIG. 1;

FIG. 5 is a side cross-sectional view along the line 5—5 of FIG. 1; and,

FIG. 6 is a perspective view of the set of removable gears used for performing multiplication and division in a preferred embodiment of the present invention.

DESCRIPTION OF THE PREFERRED EMBODIMENT

Turning now to the drawings, in which like parts are denoted by the same reference numeral, there is shown in FIG. 1 a top view of a preferred embodiment of the calculator of the present invention. In this embodiment, the calculator includes a base 10, a strip 12 which lies above the base 10 and is spaced from it to retain a number of register gears 14,16,18,20,22. The relation of the base 10, the strip 12, and the register gears 14–22 is shown more clearly in the sectional drawings of FIGS. 2, 4 and 5. From these drawings it is seen that the base 10 includes sockets 24,26,28,30 for receiving an insertable and removable carry-over gear 32.

The strip 12 includes inwardly-arched portions 34 which permit the carry-over gears 32 to be inserted in a direction perpendicular to the base 10. The strip 12 further includes recessed areas 36 which permit the numerals on the teeth of the register gears 14-22 to be seen while the adjacent portions of those gears are covered by the strip 12 when viewed from in front of the base 10. As exemplified by the register gear 14 of FIG. 1, the successive teeth of the gear are numbered from zero through N-1, where N is the base or modulus of the number system in which the calculations are to be performed. In the preferred embodiment, all of the register gears are numbered in the same direction around the gear. These numbers may be painted, printed, or molded onto the register gears 14-22, which all have the same number of teeth. The numbers are placed on the teeth of the gear, in a preferred embodiment, rather than nearer the center of the gear so that they will be more readily visible through the recessed areas 36 in the strip 12.

The base 10 further includes a ones set of sockets 38, a tens set of sockets 40, a hundreds set of sockets 42, a thousands set of sockets 44 and a ten thousands set of sockets 46. These sets of sockets are identical, and each set includes nine overlapping individual sockets. The purpose of the individual sockets is to receive insertable and removable gears, such as that shown in FIG. 6, which are used for multiplying and dividing. When inserted, these gears engage the register gears 14-22. The insertable and removable gears are supplied in various diameters for producing a multiplying effect when they are rotated, as will be described below. For example, the gear 48 shown in FIG. 1 has the same diameter and number of teeth as the register gear 14, and is used for multiplying by 1. This gear 48 will therefore be referred to as an X1 gear. Further by way of illustration, the gear 50 shown in FIG. 6 has twice the diameter and twice the number of teeth as the register gear 14, and thus, each revolution of the gear 50 produces a double amount of rotation of the register gear 14. For this reason, the gear 50 will be referred to as an X2 gear. Similarly, the individual sockets in the sets of sockets 38-46 will be referred to as the X1, X2, — X9 sockets as shown in FIG. 1. The X1 gear 48 is always placed in one of the X1 sockets, while the X2 gear 50 is always placed in one of the X2 sockets. In other embodiments where a number system of base N is used, the largest gear would have a diameter equal to N-1 times the diameter of the register gear 14 and would be placed in the X(N−1) socket.

As may best be seen in FIGS. 1, 2 and 6, the insertable and removable gears include a knob 52 for use in lifting the gears and a plug portion 54 of such diameter as to produce a sliding fit when inserted into one of the sockets of the series 38-46. Likewise, the insertable and removable carry-over gears 32 are provided with knobs 56 for grasping and lifting them, and with plug portions 58 which are inserted to produce an easy sliding fit within any of the equal sized sockets 24-30.

As may best be seen in FIG. 2, both the sockets 24-30 for the carry-over gears and the series of sockets 38-46 for the multiplying and dividing gears are provided with sheets of ferro-magnetic material 60, 62 along the bottom of the sockets respectively, in a preferred embodiment. In this preferred embodiment, the carry-over gears 32 are provided with permanent magnets 64 in the plug portion 58 thereof, and the multiplying and dividing gears exemplified by the gear 48 are provided with permanent magnets 66 in the plug portions 54 thereof. Magnetic attraction between the permanent magnets 64, 66 and the ferro-magnetic material 60, 62 prevents the removable gears from falling out of their sockets when the calculator is tilted to certain positions.

As shown in FIGS. 2, 4 and 5, the base 10 further includes sockets 68 into which a plug portion 70 of each of the register gears 14-22 fits snugly to hold the register gear in place laterally. The plug portion 70 does not extend to the bottom of the sockets 68. Instead, each of the register gears 14-22 rides on a set of ball detents 72 as shown in FIG. 2. Recessed portions 74 in the underside of the register gears 14-22 coact with the ball detents 72 to urge the register gears to rotate to positions where the numerals on their upper surfaces will be visible through the recessed areas 36 of the strip 12, and operate to prevent the register gears 14-22 from remaining in a position where portions of two numerals are visible through the recessed areas 36. The register gears 14-22 are provided with hubs 76 against which the strip 12 bears, urging the underside of the register gears, including the recessed portions 74, against the ball detents 72 on which the register gears ride.

Several additional structural features must be explained if the operation of the calculator is to be understood. The insertable and removable gears used for multiplying and dividing, as exemplified by the gears 48 and 50 resemble ordinary spur gears. As shown in FIG. 6, the teeth of these gears extend across the entire width of the gears.

On the register gears 14-22, a different arrangement is used. Two sets of teeth are used on each register gear. These sets of teeth are juxtaposed and the resulting structure resembles two ordinary spur gears placed side by side on a common axle. For example, the register gear 14, as shown in FIGS. 1 and 2, has an upper set of ten teeth 78, while the lower set of teeth shown in FIG. 3 consists of only one tooth 80, which is used to provide the carry-over function.

The tens register gear 16 has two sets of teeth similar to those of the ones register gear 14, but arranged oppositely; that is, with ten teeth 82 in the lower level and only a single tooth 84 in the upper level as shown in FIGS. 4 and 5. It is thus seen that the carry-over gears 32 are used merely for transmitting the intermittent rotational motion imparted to them by the single tooth on one of the register gears to the ten-toothed set of gears on the register gear representing the next-higher digit in the register. Because the single tooth 80 of gear 14 is on a lower level than the set of ten teeth 78, the teeth of the carry-over gear 32 of FIG. 2 must also be on the lower level; that is, the level closest to the base 10. Accordingly, the set of 10 teeth 82 on the gear 16 must be on its lower level, while the single tooth 84 of the register gear 16 must be on its upper level as shown in FIGS. 4 and 5.

By a similar argument, it can be shown that the register gear 18 must have ten teeth in its upper level and its single carry-over tooth is located in its lower level. Likewise, the register gear 20 has ten teeth on its lower level, and its single carry-over tooth is located on its upper level. Finally, the register gear 22 has ten teeth on its upper level, and its single carry-over tooth is located on its lower level, although that tooth is not used.

It is thus seen that the teeth of the carry-over gears 32 must be located at the lower level when the carry-over gear is inserted in sockets 24 or 28, and must be located at the upper level when the carry-over gear is inserted into the sockets 26 or 30. In the preferred embodiment of the present invention, the elevation of the teeth of the carry-over gear 32 is determined by the depth of the socket into which it is inserted. Thus, the sockets 24, 28 are deeper than the sockets 26, 30.

In an alternative embodiment, the elevation of the set of teeth of the carry-over gears 32 is determined by whether the plug portion 58 or the knob portion 56 is inserted into one of the sockets 24–30, which in this embodiment have the same depth. In this alternative embodiment, the sockets 24, 28 and the plug portion 58 are painted one color, and the sockets 26, 30 and the knob 56 are painted another color. In this embodiment, the operator must select the appropriate end of the carry-over gear to insert in a particular socket.

When the base ten number system is used, the register gear 14 has ten teeth numbered from zero through 9 as shown in FIG. 1. It is desired that the intermittent carry-forward motion of the carry-over gear 32 in socket 24 should occur as the register gear 14 rotates clockwise from the position where the numeral 9 is displayed to the position where the numeral 0 is displayed. Accordingly, the single tooth used for producing the carry-over motion and located on the lower tooth level of the gear 14 must be located around its circumference at a position beneath the tooth bearing the numeral 3, as indicated in FIG. 3.

It is also noteworthy that the numerals on the insertable and removable gears used for multiplying and dividing and exemplified by the gears 48, 50 are positioned at the notches between the teeth rather than on the teeth, as may be seen in FIG. 1 and FIG. 6. The gear 48 shown in FIG. 1 is used for multiplying by one and it has one tooth between each of the numerals. The gear 50 shown in FIG. 6 is used for multiplying by two and it has two teeth between adjacent successive numerals. Similarly, for the remaining gears used for multiplying; for example, the X8 gear would have eight teeth between successive numerals, and it would be eight times as large in diameter as the gear 48.

The operation of the device will be described by way of examples illustrating how the calculator is used to perform addition, subtraction, multiplication, and division. Reference to FIG. 1 will be helpful.

To perform the addition 8+5, initially all of the removable gears should be removed from the base 10, and the register gears 14–22 should be set to read zero. Next, the ones register gear 14 should be rotated to read eight. Next, the X1 gear 48 is inserted into the X1 socket of the ones series of sockets 38 so that the number five on the gear 48 is positioned immediately opposite the number eight on the register gear 14. Next the carry-over gear 34 is inserted into the socket 24. Then, the knob of the gear 14 is turned clockwise until the numeral zero of the X1 gear 48 has been rotated counter-clockwise to the position opposite the window 86, at which the numeral three of the gear 14 appears in the window 86. Because the carry-over gear 32 has been advanced by one tooth, the numeral one on the tens register gear 16 has been rotated so that it appears displayed in the window 88.

To carry out the addition 8+95, the procedure of the preceding paragraph is followed exactly and then the following steps are added. The gear 48 is removed from the ones set of sockets 38 and inserted at the X1 position of the tens set of sockets 40 with the numeral four of the gear 48 opposite the window 88. Next, the carry-over gear 32 is removed from the socket 24 and inserted into the socket 26. Thereafter, the gear 16 is rotated clockwise until the numeral zero of gear 48 moves into a position opposite the window 88. The register will now indicate the sum 95 in the windows 88, 86.

As might be expected, the operation of subtraction is the inverse of the operation of addition. For example, if 28 is to be subtracted from 45, the following procedure is used. First, all of the removable gears are removed from the base 10 and the register wheels 14, 16 are rotated so that the numerals four and five appear in the windows 88, 86, respectively. Next, the gear 48 is inserted into the X1 position of the ones set of sockets 38 with the numeral zero of it adjacent the window 86, care being taken not to disturb the position of the register gear 14. Next, the carry-over gear 32 is inserted into the socket 24 and then the gear 14 is rotated counter-clockwise until the numeral eight of the X1 gear 48 is adjacent the window 86. Next, the gear 48 is removed from the ones set of sockets 38 and inserted into the X1 position of the tens set of sockets 40, with the numeral zero of the gear 48 adjacent the window 88. The carry-over gear 32 is removed at this time. Then, the gear 16 is rotated counter-clockwise until the numeral two of gear 48 is opposite the window 88. The digits of the answer seventeen are now displayed in the windows 88 and 86.

One of the more novel features of the present invention is the manner in which the multiplication is performed. This will be illustrated first by the example 4×7. Initially, the base 10 is cleared of all removable gears and the register is set to read zero. Next, the X7 gear is selected and is inserted into the X7 position of the ones set of sockets 38 with the numeral four of the X7 gear adjacent the window 86. The gear 14 is then rotated clockwise until the numeral zero of the X7 gear is adjacent to the window 86. Because there are seven teeth between successive numbers on the X7 gear, the register 14 will be rotated through a total of twenty-eight teeth, the carry-over gear 32 will have been advanced twice and the numerals two and eight of the answer will appear in the windows 88, 86, respectively.

If the multiplication problem to be solved is 24×7, that problem may be solved by adding the following additional steps to the procedure described in the preceding paragraph. The X7 gear is removed from the X7 position in the ones set of sockets 38 and is inserted into the X7 position of the tens set of sockets 40 with its numeral two adjacent the window 88. The carry-over gear 32 is removed from the socket 24 and inserted into the socket 26. Next, the gear 16 is rotated clockwise until the numeral zero of gear X7 is opposite the window 88. This rotation produces an incremental movement of the carry-over gear so that the digits one, six, eight of the answer are displayed in the windows 90, 88, 86 of the register, respectively.

If the multiplication problem to be solved was 24×57, the steps described above in connection with the multiplication of 24×7 would be followed with the addition of the following steps. The X7 gear is removed from the base 10 and the X5 gear is inserted into the X5 position of the tens set of sockets 40 with its numeral four adjacent the window 88. Carry-over gears 32 are inserted into the sockets 26, 28, 30, but no carry-over gear is left in the socket 24. Next, the gear 16 is rotated clockwise until the numeral zero of the X5 gear is adjacent the window 88. Next, the X5 gear is removed from its position in the tens set of sockets 40 and is inserted into the X5 position of the hundreds set of sockets 42 with its numeral two adjacent the window 90. The carry-over gear is removed from the socket 26 so that carry-over gears remain inserted only in the sockets 28, 30. Next, the gear 18 is rotated clockwise until the numeral zero of X5 is adjacent the window 90. At this point, the digits of the answer one, three, six, eight are displayed in the windows 92, 90, 88, 86, respectively.

The procedure used for performing division on the calculator will now be described by way of the example 136÷7. As always, the first step is to remove all of the removable gears from the base 10 and to set the register equal to zero. Next, the register gears 18, 16, 14 are turned so that the numbers one, three and six are displayed respectively in the windows 90, 88, 86. Next, the X7 gear is selected and is placed in the X7 position of the tens set of sockets 40 with its numeral zero adjacent the window 88. A carry-over gear 32 is inserted into the socket 26, but there should be no carry-over gear in the socket 24. Next, the gear 16 is turned counter-clockwise until the number displayed in the register is less then seventy. This occurs when the number on the X7 gear nearest the window 88 is the number one. At this point, the operator writes the number ten on a scratch pad or remembers it. Next, the X7 gear is removed from the tens set of sockets 40 and is replaced into the X7 position in the ones set of sockets 38 with its numeral zero adjacent the window 86. The carry-over gear 32 is removed from the socket 26 and a carry-over gear is inserted into the socket 24. Next, the gear 14 is turned counter-clockwise until the numeral displayed in the window 86 becomes less than seven. This occurs when the X7 gear has been turned to a position in which its numeral nine is nearest the window 86. At this point, the operator notes the numeral nine on a scratch pad or remembers it. Also, at this point the number displayed in the window 86 is a three. The first numeral ten written on the scratch pad is then added to the second numeral nine on the scratch pad to obtain the quotient nineteen. If necessary, the addition of these numbers can be carried out on the calculator. The numeral three which was displayed at the window 86 on the gear 14 is the remainder, thereby verifying that 136÷7 equals nineteen, with a remainder of three.

Thus, there has been described a preferred embodiment of an educational mechanical calculator in which the only moving parts are gears and which performs the operations of multiplication and division through the use of a set of insertable the removable gears of various sizes. The calculator is manually operated and is safe and reliable to use.

Although the foregoing detailed description is illustrative of the preferred embodiment of the invention, it is to be understood that additional embodiments thereof will be obvious to those skilled in the art. The embodiments described herein, together with those additional embodiments are considered to be within the scope of the invention.

What is claimed is:

1. An educational mechanical calculator for use in teaching arithmetical concepts comprising:
   a base;
   register gears mounted on said base with their axes perpendicular to a common plane spaced above the base, said register gears spaced sufficiently far part that they do not engage one another, and each bearing marks representing the numerals 0, 1 ... N, the marks being equally spaced around each of said register gears;
   a carry-over gear mechanically unattached to the aforementioned elements, and selectively insertable into and removable from said base by a user;
   said base including portions defining carry-over sockets located in such positions relative to said register gears that when said carry-over gear has been selectively inserted into one of said carry-over sockets, it engages two adjacent register gears;
   each of said register gears having a first set of teeth which extend perpendicularly from one side of said common plane and a second set of teeth which extend perpendicularly from the opposite side of said common plane;
   on successive register gears the first set of teeth and then the second set of teeth alternately consist of a single carry-over tooth, the remaining set of teeth on each register gear having $N=1$ teeth;
   the depths of successive carry-over sockets alternating so that when said carry-over gear is inserted into them in sequence its teeth will alternately engage the first sets of teeth of a first register gear and of an adjacent second register gear and then the second sets of teeth of said register gear and of an adjacent third register gear;
   said base further comprising a separate set of multiplying sockets associated with each of said register gears, the centers of successive multiplying sockets within each set being spaced from the center of the register gear with which the set is associated by amounts equal to $N+1$ times the radius of the associated register gear; and,
   a set of multiplying gears, mechanically unattached to any of the aforementioned elements and to each other, having radii equal to 1, 2 ... N times the radius of said register gears, having teeth adapted to engage the teeth of said register gears, and having respectively 1, 2 ... N times the number of teeth as said register wheels, said multiplying gears each bearing marks representing the same set of numerals 0, 1 ... N as on said register gears, the marks being equally spaced around each of said multiplying gears, each of said multiplying gears individually selectively insertable into and removable from one of said multiplying sockets by a user, and when so inserted engaging a register gear.

2. The mechanical calculator of claim 1 further comprising carry-over securing means associated with said carry-over gears and with said carry-over sockets to removably secure said carry-over gears within said carry-over sockets.

3. The mechanical calculator of claim 2 wherein said carry-over securing means employs magnetic attraction to removably secure said carry-over gears within said carry-over sockets.

4. The mechanical calculator of claim 1 further comprising multiplying gear securing means associated with said multiplying gears and with said sets of sockets to removably secure said multiplying gears within said sockets of each set.

5. The mechanical calculator of claim 4 wherein said multiplying gear securing means employs magnetic attraction to removably secure said multiplying gears within said sockets of each set.

* * * * *

UNITED STATES PATENT AND TRADEMARK OFFICE
CERTIFICATE OF CORRECTION

PATENT NO. : 4,218,609
DATED : August 19, 1980
INVENTOR(S) : Yi Chen

It is certified that error appears in the above-identified patent and that said Letters Patent are hereby corrected as shown below:

Cover page, change the name of the Inventor from "YI CHIN" to read --YI CHEN--.

Signed and Sealed this

Thirteenth Day of October 1981

[SEAL]

Attest:

GERALD J. MOSSINGHOFF

Attesting Officer     Commissioner of Patents and Trademarks